US011359105B2

(12) United States Patent
Feng et al.

(10) Patent No.: US 11,359,105 B2
(45) Date of Patent: Jun. 14, 2022

(54) MEDICAL WRISTBAND WITH INVISIBLE INFORMATION AND PREPARATION METHOD THEREOF

(71) Applicant: Harbin Institute of Technology,Shenzhen, Guangdong (CN)

(72) Inventors: Huanhuan Feng, Guangdong (CN); Kunkun Jiang, Guangdong (CN); Xing Ma, Guangdong (CN); Tingting Zheng, Guangdong (CN); Weiwei Zhao, Guangdong (CN); Jiaheng Zhang, Guangdong (CN)

(73) Assignee: Harbin Institute of Technology, Shenzhen, Shenzhen (CN)

(*) Notice: Subject to any disclaimer, the term of this patent is extended or adjusted under 35 U.S.C. 154(b) by 499 days.

(21) Appl. No.: 16/516,218

(22) Filed: Jul. 18, 2019

(65) Prior Publication Data
US 2020/0199393 A1    Jun. 25, 2020

Related U.S. Application Data

(63) Continuation of application No. PCT/CN2019/091243, filed on Jun. 14, 2019.

(30) Foreign Application Priority Data

Dec. 24, 2018   (CN) .......................... 201811584149.3

(51) Int. Cl.
*C09D 11/00*    (2014.01)
*C09D 11/50*    (2014.01)
(Continued)

(52) U.S. Cl.
CPC .............. *C09D 11/50* (2013.01); *C09D 11/03* (2013.01); *C09D 11/328* (2013.01); *G09F 3/005* (2013.01); *C09D 11/023* (2013.01)

(58) Field of Classification Search
USPC ...................... 106/31.01, 31.13, 31.14, 31.15
See application file for complete search history.

(56) References Cited

U.S. PATENT DOCUMENTS

| 6,924,781 B1* | 8/2005 | Gelbman | ............. G06F 3/1454 340/10.6 |
| 2005/0103424 A1* | 5/2005 | Nguyen | ................ B41M 3/144 156/67 |
| 2005/0233097 A1* | 10/2005 | Tojo | ..................... B41M 5/5227 428/32.26 |

FOREIGN PATENT DOCUMENTS

| CN | 102977685 A | 3/2013 |
| CN | 103374262 A | 10/2013 |

(Continued)

*Primary Examiner* — James E McDonough

(57) ABSTRACT

The present invention relates to a medical wristband with invisible information and a method for manufacturing the same. The conventional developed dyes or inks in the prior art can store information which, however, is visible. In the present invention, polystyrene (PS) microspheres are prepared by micro-emulsification: PS particles are dissolved in a toluene solution and a fluorescent dye is added to obtain a fluorescent solution; an SDS solution is added in and mixed with the fluorescent solution to obtain a system to be ultrasonically emulsified; and the system is ultrasonically emulsified and the toluene is completely volatilized. The ink can be used directly as an invisible ink. The information is written, as two-dimensional codes and by the ink, on a piece of non-fluorescent paper, and plastic-packaged onto a wristband of a patient. Information about a patient can be successfully scanned in the ease of UV on.

9 Claims, 3 Drawing Sheets

(51) Int. Cl.
*C09D 11/328* (2014.01)
*G09F 3/00* (2006.01)
*C09D 11/03* (2014.01)
C09D 1/00 (2006.01)
C09D 4/00 (2006.01)
C09D 5/00 (2006.01)
C09K 3/00 (2006.01)
C09D 11/023 (2014.01)

(56) References Cited

FOREIGN PATENT DOCUMENTS

| | | |
|---|---|---|
| CN | 204044853 U | 12/2014 |
| CN | 105086628 A | 11/2015 |
| JP | 2006130664 A * | 5/2006 |

* cited by examiner

MEDICAL WRISTBAND WITH INVISIBLE INFORMATION AND PREPARATION METHOD THEREOF

CROSS-REFERENCE TO RELATED APPLICATIONS

This application is a continuation of International Application No. PCT/CN2019/091243 with a filing date of Jun. 14, 2019, designating the United States, which claims priority to Chinese Application No. 201811584149.3 with a fill date of Dec. 24, 2018. The content of the aforementioned applications, including any intervening amendments thereto, are incorporated herein by reference.

TECHNICAL FIELD

The present invention belongs to the technical field of manufacturing medical instruments and particularly relates to a medical wristband with invisible information and a method for manufacturing the same.

BACKGROUND OF THE PRESENT INVENTION

At present, the commercially available medical wristbands are provided for simple identification of information about a patient. Generally, the information is handwritten, printed, or identified by a chip. Handwriting of such information results in low efficiency, a risk of malicious modification, and information leakage. Printing of such information also results in privacy disclosure. Although protecting the privacy, identification by a chip is high in cost and causes waste since such a wristband is usually disposable. Therefore, the present invention provides an invisible ink, which is applied in medical wristbands to hide information about a patient thus to protect the privacy of the patient.

The conventional developed dyes or inks, well-known in the prior art, can state in which, however, is visible.

In addition, in the prior art, a novel reaction-reversible ink has been disclosed in CN103374262A and CN102977685A, which is suitable to be used for writing directly on a piece of paper. This invisible ink is colorless in normal situation. The writing may be shown in black when rubbing this piece of paper by bronzes. In this way, information identification is realized. This invisible ink is composed of methyl octadecanoate, methyl palmitate, toluene, silver nitrate, copper nitrate, ethanol and distilled water. However, by this method, it is quite inconvenient to read the information and is also impossible to realize lossless and contactless reading. It is not suitable for large-scale encrypted application of information.

SUMMARY OF THE PRESENT INVENTION

In view of problems in the prior art, the present invention provides a medical wristband with hidden information about a patient. In the present invention, polystyrene (PS) microspheres are prepared by micro-emulsification: PS particles are dissolved in a toluene solution and a fluorescent dye is added to obtain a fluorescent solution; an SDS solution is added in and mixed with the fluorescent solution to obtain a system to be ultrasonically emulsified; and then the system is ultrasonically emulsified and the toluene is completely volatilized. The ink can be used directly as an invisible ink.

In addition, as a preferred solution of the present invention, in order to increase the complexity and encryption performance of information storage, two dyes are added in the PS microspheres. The fluorescence resonance energy transfer (FRET) is adjusted by changing the ratio and concentration of the two fluorescent dyes, to obtain invisible fluorescent inks in different colors.

The present invention has the following beneficial effects. The information is written, as two-dimensional codes and by the ink, on a piece of nonfluorescent paper, and plastic-packaged onto a wristband of a patient. Information about a patient can be successfully scanned in the case of UV on. In this way, the privacy of individuals is protected.

Specifically, the present invention is realized by the following technical solutions.

First, the present invention provides a preparation method for an invisible ink, comprising steps of:

S1: preparing PS microspheres by micro-emulsification: dissolving PS particles in a toluene solution to obtain a PS-toluene solution having a content of the PS of 1% by mass fraction, and adding a single fluorescent dye anthracene to obtain a PS-toluene@anthracene fluorescent solution having a content of the dye of 0.1% by mass fraction;

S2: adding an aqueous solution of SDS in the solution obtained in S1 and mixing, to obtain a system to be ultrasonically emulsified; and S3: ultrasonically emulsifying the solution obtained in S2, and completely volatilizing the toluene.

The selection of the above materials is based on the identification rate of information by the color of the writing in the case of UV on in a lot of coating experiments. In the present invention, the writing and the substrate are substantially the same and undistinguishable. However, in the case of UV on, the writing is clearly visible. The distinguishable fluorescent particles are used to realize the encryption of information.

As a preferred technical solution of the present invention, the PS particles have a size of 100±20 nm. This size is determined by the display effect and adhesion in a lot of coating experiments. In the present invention, it is found by experiments and tests, that the PS fluorescent particles having a size of 100±20 nm have the advantages of easy dispersion, easy coating, high adhesion, etc. The PS particles are prepared by micro-emulsification in the present invention. The size is determined by a nano-particle size analyzer and a ZETA potential analyzer.

As a preferred technical solution of the present invention, in S2, 2 mL of the solution obtained in S1 and 14 mL of the aqueous solution of SDS having a concentration of 5 mg/mL are provided and stirred, after adding magnetons therein, on a magnetically-driven rotating mechanism for 1 h at 300 r/min, to obtain the system to be ultrasonically emulsified. It is found, by a lot of experiments, that those experimental parameters are optimal experimental parameters for obtaining a homogeneous system by using the above devices.

As a preferred technical solution of the present invention, in S3, the solution obtained in S2 is ultrasonically emulsified on an ultrasonic cell crusher at power 10%, with five cycles within 1 min (2 s/2 s), and then stirred on the magnetically-driven rotating mechanism for 24-48 h at 300 r/min, until the toluene is completely volatilized. It is found, by a lot of experiments, that those experimental parameters are optimal experimental parameters for obtaining a PS-toluene@ anthracene fluorescent solution.

As an application of the medical wristband with invisible information provided in the present invention, considering the storage of information about a patient by two-dimensional codes in the medical wristband, a preferred technical solution is provided: in S1, both fluorescent dyes, i.e., coumarin6 and anthracene, are added to obtain a PS-toluene@coumarin6@anthracene fluorescent solution having a content of the dyes of 0.1% by mass fraction. A ratio of coumarin6 to anthracene by mass is 45%:55%, 40%:60%, 35%:65%, 30%:70%, 25%:75%, 20%:80%, 15%:85%, 10%:90%, 5%:95%, 1%:99%. Fluorescent particles having a ratio of coumarin6 to anthracene, by mass, of 20%:80%, 15%:85%, 10%:90%, 5%:95%, 1%:99% can realize the purpose of hiding information on a piece of paper.

As a preferred technical solution of the present invention, the ratio is preferably 1%:99%. In this case, the present invention exhibits excellent information hiding performance: the information is invisible in the case of UV off and the information is visible in the case of UV on.

Another objective of the present invention is to provide an invisible ink usable in medical instruments. The information is written by the prepared invisible fluorescent ink on a piece of non-fluorescent paper, the written paper is colorless under natural light, and the ink can be used directly as an invisible ink. More specifically, the information is written by the invisible ink as two-dimensional codes; and the information is invisible in the case of UV off and the information is visible in the case of UV on. Information about a patient can be identified by scanning by an intelligent device.

As an implementation of the present invention, the PS fluorescent particles are centrifugally extracted and mixed with glycerol to obtain a high-viscosity mixture ink by which coating or printing can be realized by a patterned stamp. In the case of UV on, at 365 nm, the information can be identified and read by scanning by conventional scanning software, for example, by the scanning function in a mobile phone.

BRIEF DESCRIPTION OF THE DRAWINGS

FIG. 2A-2C is a schematic view of displaying information about a patient in the medical wristband with invisible information according to the present invention, wherein FIG. 2A is a schematic view of two-dimensional codes in the medical wristband with invisible information under natural light, FIG. 2B is a schematic view of two-dimensional codes in the medical wristband with identified information in the case of UV on, and FIG. 2C is a schematic view of identifying the information about the patient in the wristband by scanning the two-dimensional codes.

DETAILED DESCRIPTION OF THE PRESENT INVENTION

The present invention will be further described below in detail with reference to the accompanying drawings and by embodiments. The implementations of the present invention are, however, not limited thereto.

Embodiment 1

Invisible Ink Containing a Single Dye and a Preparation Method Thereof

Figure 1:
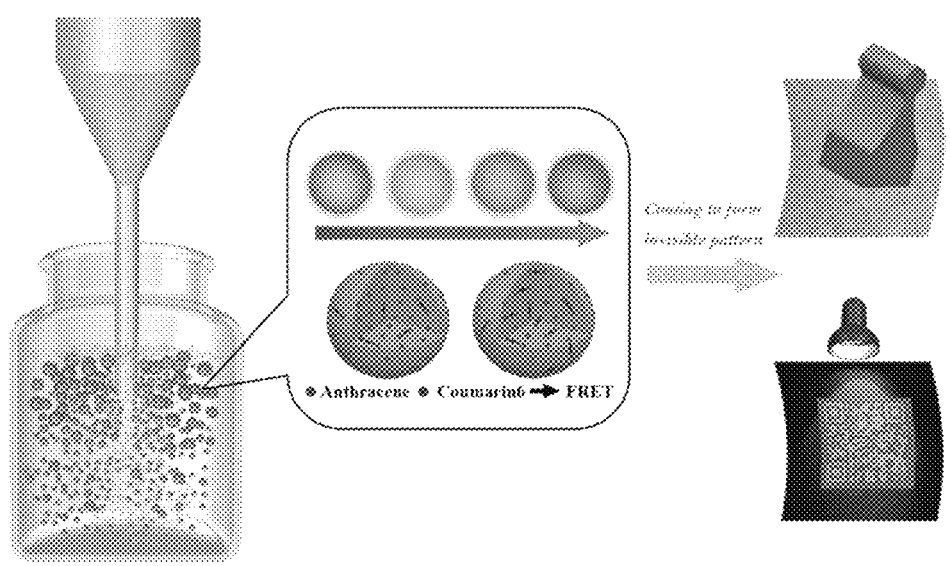
FIG. 1 is a schematic flowchart of a process of preparing the invisible ink according to the present invention.

Referring to FIG. 1, which is a flowchart of a process of preparing the invisible ink, the process of preparing the invisible ink comprises following steps.

S1: PS microspheres are prepared by micro-emulsification. PS particles are dissolved in a toluene solution to obtain a PS-toluene solution having a content of the PS of 1% by mass fraction, and a single fluorescent dye anthracene is added to obtain a PS-toluene@anthracene fluorescent solution having a content of the dye of 0.1% by mass fraction.

S2: 2 mL 1 wt % PS-toluene@coumarin6 solution and 14 mL of the SDS solution having a concentration of 5 mg/mL are provided and stirred, after adding magnetons therein, on a magnetically driven rotating mechanism for 1 h at 300 r/min, to obtain a system to be ultrasonically emulsified.

S3: The solution obtained in S2 is ultrasonically emulsified on an ultrasonic cell crusher at power 10%, with five cycles within 1 min (2 s/2 s), and then stirred on the magnetically-driven rotating mechanism for 24-48 h at 300 r/min, until the toluene is completely volatilized.

Embodiment 2

Invisible Ink Containing Two Dyes and a Preparation Method Thereof

S1: PS microspheres are prepared by micro-emulsification. PS particles are dissolved in a toluene solution to obtain a PS-toluene solution having a content of the PS of 1% by mass fraction, and both fluorescent dyes, i.e., coumarin6 and anthracene (a ratio of coumarin6 to anthracene by mass is 1%:99%), are added to obtain a PS-toulene@coumarin6@anthracene fluorescent solution having a content of the dyes of 0.1% by mass fraction.

S2: 2 mL of 1 wt % PS-toluene@anthracene solution and 14 mL of the SDS solution having a concentration of 5 mg/mL are provided and stirred, after adding magnetons therein, on a magnetically-driven rotating mechanism for 1 h at 300 r/min, to obtain a system to be ultrasonically emulsified.

S3: The solution obtained in S2 is ultrasonically emulsified on an ultrasonic cell crusher at power 10%, with five cycles within 1 min (2 s/2 s) and then stirred on the magnetically-driven rotating mechanism for 24-48 h at 300 r/min, until the toluene is completely volatilized.

Embodiment 3

A Medical Wristband with Invisible Information

Figure 2A:
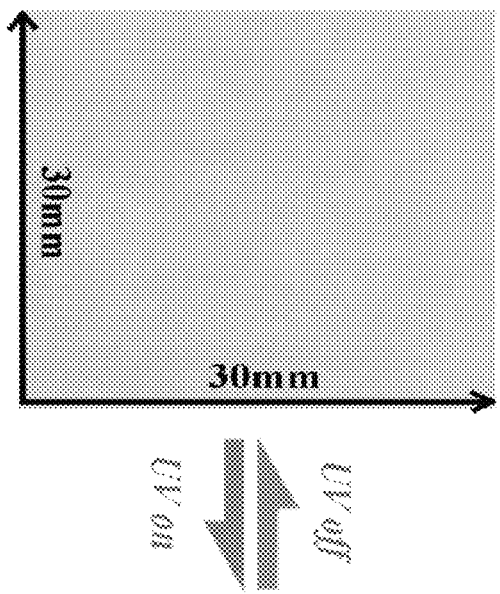
Figure 2B:
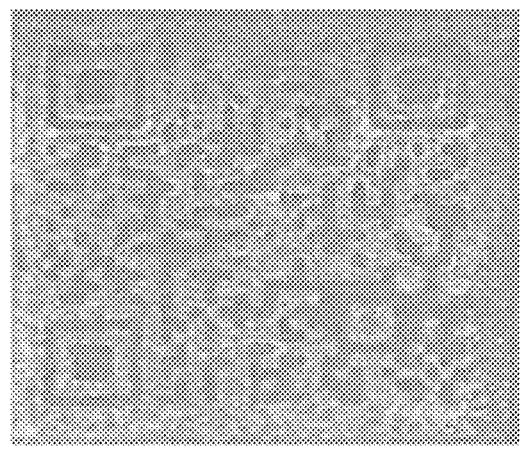
Figure 2C:

The information is written, as two-dimensional codes, on a piece of non-fluorescent paper by the invisible fluorescent ink prepared in embodiments 1 and 2. The written paper is colorless under natural light. The information is invisible in the case of UV off and the information is visible in the case of UV on. Information about a patient can be identified by scanning by an intelligent device. The medical wristband with invisible information and the displayed information are shown in FIG. 2A-2C.

The PS fluorescent particles are centrifugally extracted and mixed with glycerol to obtain a high-viscosity mixture ink by which coating or printing can be realized by a patterned stamp. In the case of UV on, at 365 nm, the information can be identified and read by scanning by conventional scanning software, for example, by the scanning function in a mobile phone.

The embodiments are merely preferred implementations of the present invention, and the implementations of the present invention are not limited thereto. Any other alternations, modifications, replacements, combinations and simplifications made without departing from the spirit essence and principle of the present invention shall be regarded as equivalent substitutions and shall fall into the protection scope of the present invention.

What is claimed is:

1. A preparation method for an invisible ink, comprising steps of:
    S1: preparing PS microspheres by micro-emulsification: dissolving PS particles in a toluene solution to obtain a PS-toluene solution having a content of the PS of 1% by mass fraction, and adding a single fluorescent dye anthracene to obtain a PS-toluene@anthracene fluorescent solution having a content of the dye of 0.1% by mass fraction;
    S2: adding an aqueous solution of SDS in the solution obtained in S1 and mixing, to obtain a system to be ultrasonically emulsified; and
    S3: ultrasonically emulsifying the solution obtained in S2 and completely volatilizing the toluene.

2. The preparation method according to claim 1, wherein the PS particles have a size of 100±20 nm.

3. The preparation method according to claim 1, wherein, in S2, 2 mL of the solution obtained in S1 and 14 mL of the aqueous solution of SDS having a concentration of 5 mg/mL are provided and pre-stirred, after adding magnetons therein, on a magnetically-driven rotating mechanism for 1 h at 300 r/min, to obtain the system to be ultrasonically emulsified.

4. The preparation method according to claim 1, wherein, in S3, the solution obtained in S2 is ultrasonically emulsified on an ultrasonic cell crusher at power 10%, with five cycles within 1 min (2 s/2 s), and then stirred on the magnetically-driven rotating mechanism for 24-48 h at 300 r/min, until the toluene is completely volatilized.

5. The preparation method according to claim 1, wherein, in S1, both fluorescent dyes, i.e., coumarin6 and anthracene, are added to obtain a PS-toluene@coumarin6@anthracene fluorescent solution having a content of the dyes of 0.1% by mass fraction.

6. The preparation method according to claim 5, wherein, a ratio of coumarin6 to anthracene by mass is 45%:55%, 40%:60%, 35%:65%, 30%:70%, 25%:75%, 20%:80%, 15%:85%, 10%:90%, 5%:95%, 1%:99%.

7. An invisible ink usable in medical instruments, wherein the invisible ink is obtained by the preparation method according to claim 1.

8. A medical wristband with invisible information, wherein the information is written on a piece of non-fluorescent paper by the invisible ink according to claim 7, the written paper is colorless under natural light, and the ink can be used directly as an invisible ink.

9. The medical wristband with invisible information according to claim 8, wherein the information is written by the invisible ink as two-dimensional codes; the information is invisible in the case of UV off and the information is visible in the case of UV on; and information about a patient can be identified by scanning by an intelligent device.

* * * * *